No. 629,958. Patented Aug. 1, 1899.
H. L. DOHERTY & I. BUTTERWORTH.
GAS PURIFIER.
(Application filed Apr. 11, 1898.)

(No Model.) 2 Sheets—Sheet 1.

WITNESSES:
H. B. Bradshaw
A. L. Phelps

INVENTORS
Henry L. Doherty
Irvin Butterworth
BY C. C. Shepherd
ATTORNEY

THE NORRIS PETERS CO., PHOTO-LITHO., WASHINGTON, D. C.

No. 629,958. Patented Aug. 1, 1899.
H. L. DOHERTY & I. BUTTERWORTH.
GAS PURIFIER.
(Application filed Apr. 11, 1898.)
(No Model.) 2 Sheets—Sheet 2.
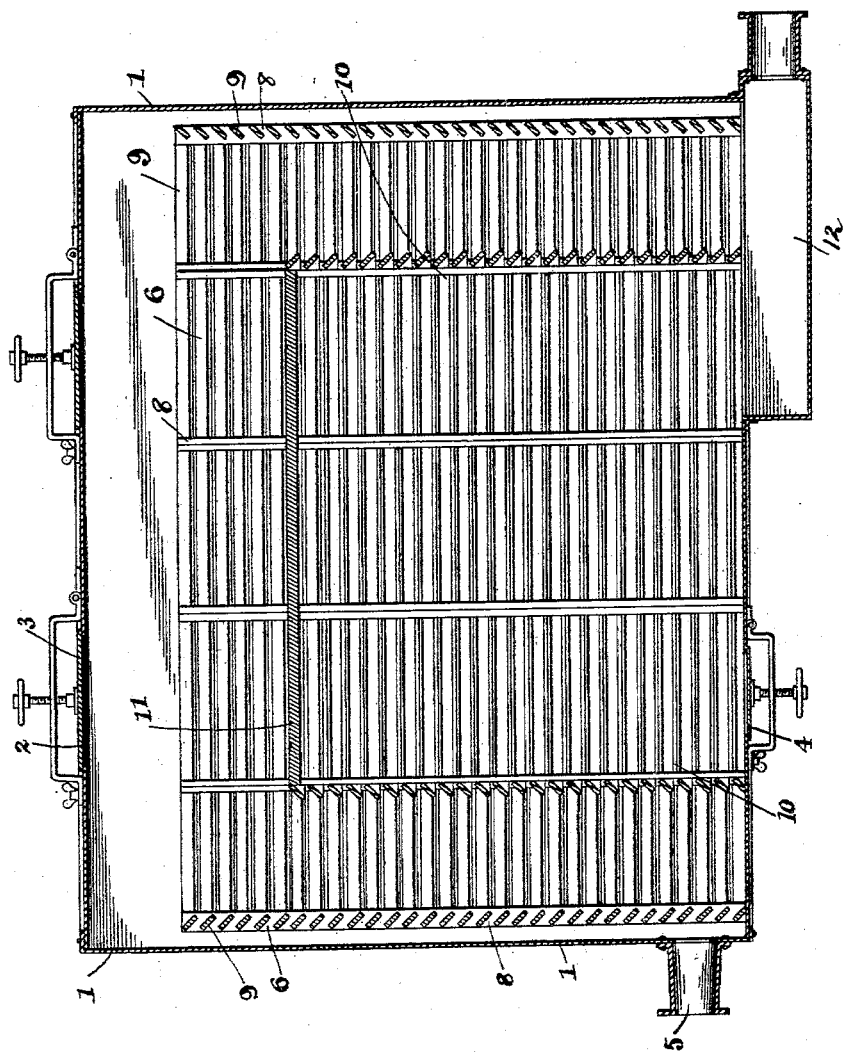
WITNESSES:
H. B. Bradshaw
A. L. Phelps
INVENTORS
Henry L. Doherty
Irwin Butterworth
BY
C. C. Shepherd
ATTORNEY

UNITED STATES PATENT OFFICE.

HENRY L. DOHERTY, OF MADISON, WISCONSIN, AND IRVIN BUTTERWORTH, OF COLUMBUS, OHIO.

GAS-PURIFIER.

SPECIFICATION forming part of Letters Patent No. 629,958, dated August 1, 1899.

Application filed April 11, 1898. Serial No. 677,114. (No model.)

*To all whom it may concern:*

Be it known that we, HENRY L. DOHERTY, residing at Madison, in the county of Dane and State of Wisconsin, and IRVIN BUTTERWORTH, residing at Columbus, in the county of Franklin and State of Ohio, citizens of the United States, have invented a certain new and useful Improvement in Gas-Purifiers, of which the following is a specification.

Our invention relates to the improvement of apparatus for purifying gases or vapors or extracting ingredients therefrom; and the objects of our invention are to provide a simple, reliable, and efficient apparatus of improved construction, whereby impurities may be absorbed and removed from gases or vapors and whereby any desired elements or ingredients of gases or vapors may be separated or removed therefrom, to so construct and arrange the parts of our improved apparatus as to insure the passage of the gas or vapor through a desirable quantity or thickness of absorbing material contained in the apparatus and prior to its discharge therefrom, to construct and arrange said apparatus in such manner as to provide free and unobstructed entrance for the gas or vapor into the purifying or absorbing material from more than one direction and an easy exit from such material for such gas or vapor and at the same time prevent said material from escaping from its retaining-cage, and to produce such other improvements in details of construction and arrangement of parts as will be more fully set forth hereinafter. These objects we accomplish in the manner illustrated in the accompanying drawings, in which—

Figure 1:
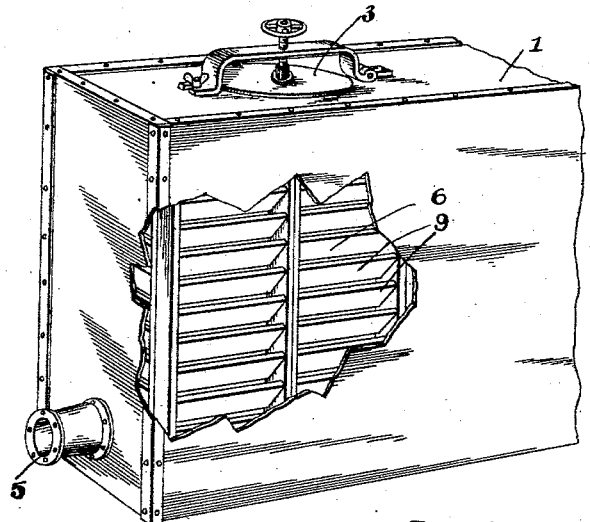
Figure 2:
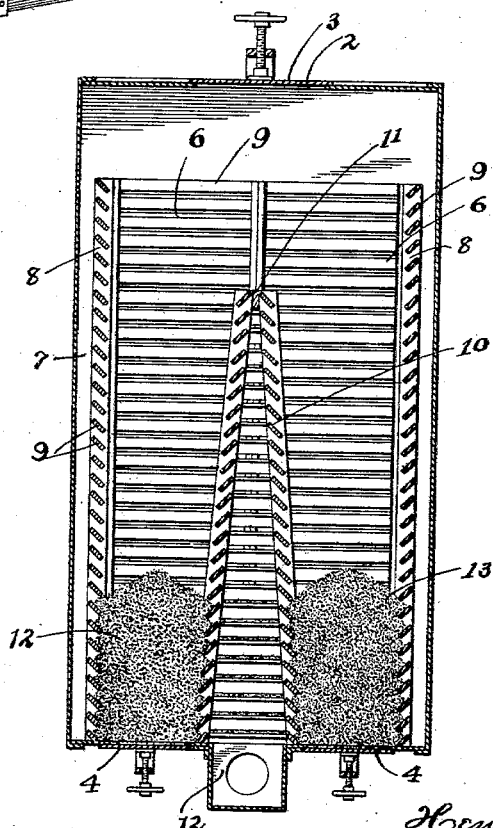

Figure 1 is a detail view in perspective of a portion of our apparatus, showing for the sake of clearness in illustration a part of the outer casing broken away. Fig. 2 is a central transverse section through said apparatus, showing a portion of the purifying or absorbing material therein; and Fig. 3 is a central longitudinal section.

Similar numerals refer to similar parts throughout the several views.

In carrying out our invention we employ a casing 1, of sheet metal or other suitable material, which may be of the general oblong box form shown or of circular or other desirable forms. In the construction of this casing we provide at desirable intervals in the upper side thereof inlet-openings 2, the latter being provided with detachable covers 3, and suitable means being employed to normally retain these covers over said openings.

In the bottom of the casing 1 we provide at suitable intervals similar outlet-openings, which are designed to be normally closed by detachable cover-plates 4, these bottom openings being preferably arranged on opposite sides of the center of the width of the casing.

Opening into the casing 1 at any suitable point is a gas or vapor inlet pipe or conduit 5.

Within and a little smaller than the external casing 1 and similar to it in shape we construct a cage or receptacle 6 for containing the purifying or absorbing material, such cage extending from the bottom of the casing 1 to a point in the upper portion thereof and being of such form as to provide a space, preferably such as indicated at 7, between its sides and ends and the corresponding sides and ends of casing 1 if other form than circular and between it and the casing 1 if circular. In the construction of the cage or receptacle 6 we employ a framework of wood, iron, or other suitable material so constructed as to contain the purifying or absorbing material, while presenting ample openings throughout its entire surface for the entrance of the gas or vapor from the space 7 and at the same time preventing the material contained therein, as hereinafter described, from falling outwardly into the space 7. This cage 6 is preferably constructed of a series of standards 8, connected by horizontal and parallel slats 9. As shown in the drawings, these slats are inclined inwardly and downwardly and arranged at such distance one from the other as to obviate any tendency of the material contained within the cage from falling outward between said slats, while the material will readily fall from them through the openings in the bottom of the casing 1 when emptying the material therefrom by gravity. Arranged centrally and of any suitable form or relative size within the cage 6 and supported on the bottom of casing 1 or otherwise is a gas-receiving receptacle or cage 10, forming an interior chamber, into which the gas or vapor enters after having passed through the purifying or absorbent material. This central outlet-cage 10 is preferably of the slatted construction described for the outer cage 6 or otherwise so constructed as to prevent the purifying or absorbing material from falling into the gas or vapor outlet chamber, while allowing the gas or vapor to pass freely through it into this chamber. As the purifying or absorbing material will preferably entirely cover and surround (except on the bottom) this outlet-cage 10, its sides are preferably inclined toward each other, converging and meeting at the top, so that the material contained in cage 6 will not fall into the outlet-chamber from the top of cage 10 and so, also, that the lesser horizontal thickness of purifying material between the bottoms of the two cages 6 and 10, although of greater density on account of the superposed material, will interpose no more friction to the passage of the gas or vapor through it from space 7 than will the greater thickness of more porous material at the top of cage 6. The inner cage 10 communicates, through a suitable opening in the bottom of casing 1, with a gas-outlet passage 12, which is preferably formed, as shown, below the external casing 1 and from which may lead a suitable gas-conducting pipe.

In utilizing the apparatus above described the purifying or absorbing material, which is indicated at 13, is introduced into the cage 6 through the openings 2 or by other suitable means. As indicated more clearly in Fig. 2 of the drawings, the material thus introduced into the cage 6 will be supported to some extent by the preferably slatted sides of the cages 6 and 10; but owing to the fact that these slats are properly spaced and inclined the material thus supported will be prevented from falling into the space 7 through the openings between the slats.

In utilizing our device for the purpose of purifying gas the unpurified gas enters the space or chamber 7 through the inlet-opening 5 and in order to escape therefrom must pass or percolate through the material 13 in order to escape into the inner cage 10 and pass out therefrom through the conduit 12. It is obvious that this tendency of the gas to pass through the purifying material is created by a pressure imparted to the gas which enters the opening 5 and that the impurity is absorbed chemically or mechanically by the purifying material. It is evident that the same operation must take place in absorbing or removing any desired ingredients from gas or vapor and that any suitable purifying or absorbing material may be employed within the cage 6.

Although a comparatively small purifying apparatus is shown herein, it is evident that the same may be of any desirable dimensions or shape and that the outlet-passage 12 instead of leading to a holder or other gas-receptacle may be connected with and pass through other apparatus similar to that herein described.

Having now fully described our invention, what we claim, and desire to secure by Letters Patent, is—

1. In a gas or vapor purifying and ingredient-absorbing apparatus, the combination with an external casing having inlet and outlet openings, of a purifying-material-receiving cage contained within said external casing, one or more of the walls of said cage provided with openings adapted to admit the gas or vapor and at the same time prevent the exit of material within the cage and a gas-receptacle contained within said cage and having openings communicating with the latter, substantially as and for the purpose specified.

2. In a gas or vapor purifying and ingredient-absorbing apparatus, the combination with an external casing having gas and purifying-material inlet and outlet openings, of a purifying-material-receiving cage contained within said external casing, said cage having its wall-surface formed of separated inclined slats, a space between said cage and external casing and a gas-receptacle contained within said cage, said gas-receptacle having openings therein adapted to admit gas or vapor and prevent the entrance of the material contained within the cage, substantially as and for the purpose specified.

3. In a purifying and ingredient-absorbing apparatus, the combination with the external casing 1 having gas and purifying-material inlet and outlet openings, of a purifying-material-receiving cage within said casing 1, the walls or a portion of the walls of said cage being formed with openings adapted to admit gas or vapor and to prevent the escape of the material contained in the cage and an internal gas receptacle or cage 10 of an inverted-V form, the walls of said cage 10 being formed of inclined separated slats, substantially as and for the purpose specified.

HENRY L. DOHERTY.
    IRVIN BUTTERWORTH.

In presence of—
 EDWARD M. TAYLOR,
 A. L. PHELPS.